United States Patent [19]

Yamaguchi et al.

[11] Patent Number: 5,286,515
[45] Date of Patent: Feb. 15, 1994

[54] CHOCOLATE FOR USE IN PRODUCING ROLLED CHOCOLATE

[75] Inventors: Kotaro Yamaguchi, Sennan; Tsugio Nishimoto, Naga; Yoshitaka Ebihara, Sakai; Hidenobu Matsunami, Senna, all of Japan

[73] Assignee: Fuji Oil Company, Limited, Osaka, Japan

[21] Appl. No.: 847,365

[22] Filed: Mar. 4, 1992

[30] Foreign Application Priority Data

Mar. 4, 1991 [JP] Japan .................................. 3-063908

[51] Int. Cl.$^5$ .............................................. A23G 1/00
[52] U.S. Cl. ...................................... 426/660; 426/607
[58] Field of Search ................................ 426/660, 607

[56] References Cited

U.S. PATENT DOCUMENTS 4,061,798  12/1977  Kanegae et al. .................... 426/607

FOREIGN PATENT DOCUMENTS 273352   7/1988  European Pat. Off. .
276548   8/1988  European Pat. Off. .
354025   2/1990  European Pat. Off. .
0151450  8/1985  United Kingdom ................ 426/607
2204590  11/1988 United Kingdom ................ 426/607

Primary Examiner—Carolyn Paden
Attorney, Agent, or Firm—Wenderoth, Lind & Ponack

[57] ABSTRACT

There is disclosed a chocolate containing disaturated monolinoleate and non-tempering type hard butter as its oil ingredients. A process for producing a rolled chocolate by rolling-up a chocolate containing disaturated monolinoleate and non-tempering type hard butter as its oil ingredients is also disclosed.

5 Claims, No Drawings

CHOCOLATE FOR USE IN PRODUCING ROLLED CHOCOLATE

FIELD OF THE INVENTION

The present invention relates to a chocolate, in particular, a chocolate which is suitable for rolling-up, and to a rolled chocolate. The term "chocolate" used herein is not limited to specific kinds of chocolate such as those prescribed by agreements, e.g., "Fair Agreements on Indication of Chocolates" as well as laws and regulations, and it is intended that other chocolates and other processed food of fats and oils using a so-called cacao butter substitute are also included.

BACKGROUND OF THE INVENTION

A rolled chocolate used for decorating cakes and the like has been produced by manually scraping a plate-like chocolate with a spoon or the like. However, since this requires skill, and it is difficult to obtain uniform products, the mass production thereof by a machine has been recently employed (JP-A 59-66842, JP-A 63-263048, etc.). In such a mechanical treatment, there is a rolling-up step such as peeling off a chocolate spread on a belt with a scraper or shaving it off therefrom with a cutting blade. Since extremely severe temperature control is required in such a rolling-up step and the shape and size become uneven in many cases even in such a highly mechanized step, the yield in the rolling-up step is usually from 50 to 70%. Further, a cylindrical inner surface of the rolled chocolate thus produced tends to become whitish and this is undesirable from the viewpoint of appearance.

OBJECTS OF THE INVENTION

One object of the present invention is to provide a chocolate which is suitable for the production of a rolled chocolate.

Another object of the present invention is to provide a process for producing a rolled or scraped chocolate wherein a broad temperature range is acceptable in a rolling-up step and the yield can be improved.

These and other objects as well as advantages of the present invention will become apparent to those skilled in the art from the following description.

SUMMARY OF THE INVENTION

The present inventors have studied in order to make a temperature range acceptable in a rolling-up step broader and to improve the yield. As a result, it has been found that inclusion of disaturated monolinoleate in oil ingredients of a chocolate is useful. Further, it has also been found that, in the case of a chocolate containing SUS type hard butter such as cacao butter or the like as a main ingredient, a difficulty is encountered in a tempering operation for preventing blooming. The present inventors have further studied this and, as a result, the present invention has been completed.

According to the present invention, there is provided a chocolate the oil ingredient of which comprises disaturated monolinoleate and non-tempering type hard butter. The present invention also provides a process for producing a rolled or scraped chocolate which comprises rolling-up a chocolate the oil ingredient of which contains disaturated monolinoleate non-tempering type hard butter.

The chocolate of the present invention can accept a broad temperature range during the rolling treatment and, when it is used for producing a rolled or scraped chocolate, the yield thereof is improved. In addition, the chocolate of the present invention can decrease damage during transportation.

DETAILED DESCRIPTION OF THE INVENTION

The disaturated monolinoleate is a glyceride (S2L) in which two residues of a saturated fatty acid (S) having 12 to 22 carbon atoms and one residue of linoleic acid (L) are coupled. The monolinoleate may be SSL in which L is bound to $\alpha$ position, SLS in which L is bound to $\beta$ position, or a mixture thereof. Although both S2Ls show little change in physical properties relative to change in temperature, SSL is more suitable for use in ice confectionary, combined foods which are treated in a broad temperature range and the like than SLS, because SSL shows less change in physical properties relative to the broad temperature range (-20° to 25° C.) than SLS.

The amount of S2L in the oil ingredient of the chocolate is not less than 10%, preferably not less than 20% in view of a broad acceptable temperature range in the rolling-up step, and the desired amount of S2L can be added by formulating a fat or oil which is rich in S2L in a chocolate (all the percents and parts used herein are by weight, unless otherwise stated). The fat or oil which is rich in S2L is obtained by interesterifying a fat or oil containing a large amount of linoleic acid, for example, safflower oil, sunflower oil, corn oil, rapeseed oil, soybean oil, in particular, safflower oil and sunflower oil with a fatty ester which is rich in saturated fatty acids by a known method, and then, if necessary, fractionating it. In particular, when the interesterification is carried out with a lipase having selectivity toward 1,3-positions, and a free fatty acid or monovalent alcoholic ester thereof is used as a saturated fatty acid introducing source, formation of S3 ingredient composed of S having not less than 16 carbon atoms which is apt to cause troubles is inhibited, and removal thereof by fractionation of the interesterified oil is not required. This is advantageous from the viewpoint of the cost of production. Further, palmitic acid or stearic acid or a monovalent alcoholic ester thereof is an advantageous S from the viewpoint of the cost. Furthermore, in the present invention, since a low melting point fraction of the interesterified oil may be contained in the oil ingredients of the chocolate, the removal of the low melting point fraction by fractionation is not required.

In the present invention, in view of prevention of blooming, non-tempering type hard butter is used as a hard butter ingredient in addition to S2L. The amount of the non-tempering type hard butter in the oil ingredient of the chocolate is not less than 15%, preferably not less than 20%. Since, by increasing this amount, the optimum temperature range in the rolling-up step is shifted toward a higher area, the temperature in the rolling-up step can be optionally varied by adjusting the amount of the hard butter as well as the amount of the low melting point glyceride described below. The non-tempering type hard butter is more effective than tempering type hard butter in respect of inhibiting appearance of bloom-like whiteness in the products. In general, the non-tempering type hard butter remains in $\beta'$ crystal form, while a tempering type hard butter shows $\beta$ stable crystal form. As the non-tempering type hard butter, any known non-tempering type hard butter can be used. Examples thereof include high trans isomer type or laurin type hard butter. High trans isomer type hard butter contains 40% or more trans acids having 16 to 22 carbon atoms as the constituent fatty acids thereof. Normally, high trans isomer type hard butter can be obtained by hydrogenating fats and oils with a nickel catalyst poisoned with sulfur or methionine, or a spent catalyst. The production thereof is disclosed, for example, by U.S. Pat. Nos. 4,061,798 and 3,856,831. Laurin type hard butter can be obtain directly from coconut oil or palm kernel oil, or by hydrogenating and/or fractionating it.

Hard butter obtained by random interesterification can be used as the non-tempering type hard butter.

As the oil ingredients of the chocolate, other ingredients, for example, a so-called tempering type hard butter such as cacao butter, fractionated shea butter, palm oil or the like may be contained therein. Further, it is preferable that low melting point triglycerides such as diunsaturated-monosaturated glyceride and triunsaturated glyceride which are derived from any above-described hard butter, the low melting fraction of interesterified oil obtained by using the above-described lipase having selectivity toward 1,3-positions, or other fats or oils which are liquid at room temperature and the like are contained therein in the amount of 5 to 30%.

The chocolate can be produced according to a conventional process for producing a so-called non-tempering chocolate. A chocolate mix can contain conventional ingredients, for example, cocoa, sugars, milk powder, emulsifying agents, flavor, pigment and the like in addition to the above-described fat or oil ingredients. Further, taste and flavor other than those of a chocolate can be provided by employing nut powder such as almond powder, peanut butter, cheese powder and the like in place of the cacao ingredient, and a so-called colored chocolate in which white chocolate base is colored can be obtained. The chocolate can be obtained by cooling the molten mix to solidify it.

The chocolate thus obtained can be supplied to the rolling-up step for the rolled chocolate within a broad acceptable temperature range.

The present invention includes a process for producing a scraped chocolate which comprises rolling-up a chocolate containing disaturated monolinoleate and non-tempering type hard butter in the oil ingredients.

As the rolling-up step, there may be employed known methods such as a manual treatment in which a plate-like molded chocolate is shaved or scraped manually by a spoon or the like, or a mechanical treatment in which the molded chocolate is scraped with a cutting blade. Alternatively, the chocolate can be obtained by spreading a chocolate mix on a belt and scraping with a scraper.

The following Examples and Comparative Examples further illustrate the present invention in detail but are not to be construed to limit the scope thereof.

EXAMPLES 1 to 5

A fat obtained by interesterifying 20 parts of safflower oil and 80 parts of ethyl stearate with a lipase having selectivity toward 1,3-positions and distilling off the ethyl ester part (Fat No. 1) had the triglyceride composition of S2L 48.3%, other S2U 6.6%, SU2+U3 44.5%, and S3 0.6%.

This fat, and high trans isomer type (manufactured and sold by Fuji Oil Company, Ltd under the trade name of "MELANO STM", melting point 36° C., the amount of trans acid 75%) or laurin type (manufactured and sold by Fuji Oil Company, Ltd. under the trade name of "PALKENA H", melting point 35° C.) as non-tempering type hard butter were used as a sample oil. 20.8 Parts of cocoa, 49.4 parts of powder sugar, 29.8 parts of the sample oil, 0.5 parts of lecithin and 0.02 parts of vanilin were admixed and the mixture was molded and solidified without any tempering step to obtain 2 kg of a plate-like chocolate, which was aged for one week at 20° C. Upon use of this chocolate as a raw material for a rolled chocolate, this chocolate was stored for one day at a predetermined temperature, and elliptically and cylindrically rolled chocolate in which the central part was swollen was produced using an apparatus as described in JP-A 63-263048.

A comparative chocolate was produced by using 50% of cacao butter (triglyceride composition: S2L 5.9%, other S2U 80.1%, SU2+U3 13.0% and S3 0.9 %) as a comparative sample oil without tempering, or using 100% of cacao butter with tempering. In the chocolate using cacao butter in an amount of 50%, blooming was already caused during solidification at 5 ° C.

TABLE 1

|  | Fat No. 1 | Hard butter and its amount |
|---|---|---|
| Example 1 | 85 parts | High trans isomer type 15 parts |
| Example 2 | 50 parts | High trans isomer type 50 parts |
| Example 3 | 30 parts | High trans isomer type 70 parts |
| Example 4 | 15 parts | High trans isomer type 85 parts |
| Example 5 | 50 parts | Laurin type 50 parts |
| Comparative Example 1 | 50 parts | Cacao butter 50 parts |
| Comparative Example 2 | 0 part | Cacao butter 100 parts |
| Comparative Example 3 | 0 part | High trans isomer type 100 parts |

The quality of the resulting rolled chocolate was evaluated by the naked eye. The results are shown in Table 2. In Table 2, "9" means that the yield was not less than 90%, "8" means that the yield was not less than 80% and less then 90%, "6" means the yield was not less than 60% and less than 70%, and "<" means that the yield was less than 50%.

TABLE 2

| | Temperature of Chocolate Products (°C.) | | | | | | | | | | | | | | | | | | | |
|---|---|---|---|---|---|---|---|---|---|---|---|---|---|---|---|---|---|---|---|---|
| | 11 | 12 | 13 | 14 | 15 | 16 | 17 | 18 | 19 | 20 | 21 | 22 | 23 | 24 | 25 | 26 | 27 | 28 | 29 | 30 |
| Example 1 | 9 | | 8 | < | | | | | | | | | | | | | | | | |
| Example 2 | | | | | | | | 8 | | 9 | | 8 | | | | | | | | |
| Example 3 | | | | | | | | | | 6 | | 9 | | 6 | | | | | | |
| Example 4 | | | | | | | | | | | | | | < | | 8 | < | | | |
| Example 5 | | | | | | | | 8 | | 9 | | 8 | | | | | | | | |
| Comparative Example 2 | | | | | | | | | | | | | | | | < | | 6 | < | |

TABLE 2-continued

| | Temperature of Chocolate Products (°C.) | | | | | | | | | | | | | | | | | | | |
|---|---|---|---|---|---|---|---|---|---|---|---|---|---|---|---|---|---|---|---|---|
| | 11 | 12 | 13 | 14 | 15 | 16 | 17 | 18 | 19 | 20 | 21 | 22 | 23 | 24 | 25 | 26 | 27 | 28 | 29 | 30 |
| Comparative Example 3 | | | | | | | | | | | | | | | | < | 6 | < | | |

As shown in Table 2, the chocolate in which cacao butter alone or high trans isomer type alone is used in the sample fat has an extremely narrow acceptable temperature range and the yield is low. On the other hand, when Fat No. 1 is used in an amount of not less than 15% of the oil ingredients, the acceptable temperature range becomes broader and the yield is improved.

EXAMPLE 6

A low melting point fraction was obtained in the yield of 75% by interesterifying 60 parts of extremely hardened soybean oil and 40 parts of safflower oil with sodium methylate and fractionating by one-stage distillation using hexane. This fat had the following triglyceride composition: S2L, 45.2%, other S2U 6.5%, SU2+U3 46.8%, and S3 1.5%.

A chocolate was produced according to the same manner as that in Example 2 except that the above fraction was used in place of Fat No. 1, and the rolling-up step was carried out at a product temperature of 18° C. to obtain a product in the yield of not less than 90%.

What is claimed is:

1. A chocolate having an oil ingredient which comprises at least 10% by weight of disaturated monolinoleate and at least 15% by weight of non-tempering type hard butter.

2. A chocolate according to claim 1, wherein the non-tempering type hard butter is high trans isomer type or laurin type.

3. A chocolate according to claim 1, wherein the disaturated, monolinoleate is contained in an amount of at least 20%.

4. A chocolate according to claim 1, wherein the non-tempering type hard butter is contained in an amount of at least 20%.

5. A chocolate according to claim 1, wherein the disaturated monolinoleate is 1,2-disaturated linoleate.

* * * * *